US012542402B2

(12) United States Patent
Henry et al.

(10) Patent No.: US 12,542,402 B2
(45) Date of Patent: Feb. 3, 2026

(54) SHIELDING STRUCTURE FOR A CARD EDGE CONNECTOR

(71) Applicant: TE Connectivity Solutions GmbH, Schaffhausen (CH)

(72) Inventors: Randall Robert Henry, Lebanon, PA (US); Brian Patrick Costello, Scotts Valley, CA (US); Brandon Michael Matthews, McAlisterville, PA (US)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 427 days.

(21) Appl. No.: 18/156,425

(22) Filed: Jan. 19, 2023

(65) Prior Publication Data

US 2024/0250480 A1 Jul. 25, 2024

(51) Int. Cl.
*H01R 13/6585* (2011.01)
*H01R 12/73* (2011.01)
*H01R 13/6594* (2011.01)

(52) U.S. Cl.
CPC ....... *H01R 13/6585* (2013.01); *H01R 12/737* (2013.01); *H01R 13/6594* (2013.01)

(58) Field of Classification Search
CPC ............ H01R 13/6585; H01R 13/6594; H01R 12/737
USPC ................................ 439/607.11, 637, 607.05
See application file for complete search history.

(56) References Cited

U.S. PATENT DOCUMENTS 6,116,926 A * 9/2000 Ortega ............... H01R 13/6471 439/857
6,328,602 B1 * 12/2001 Yamasaki .......... H01R 13/6471 439/607.11
8,465,302 B2 * 6/2013 Regnier ............... H01R 13/508 439/607.05
8,480,413 B2 * 7/2013 Minich ................ H01R 12/724 439/607.05
8,540,525 B2 * 9/2013 Regnier ............... H01R 13/646 439/79
8,764,483 B2 * 7/2014 Ellison ............... H01R 13/6587 439/607.07
9,509,100 B2 * 11/2016 Phillips .............. H01R 13/6587
9,917,406 B1 * 3/2018 Iwasaki .............. H01R 13/6588
10,218,108 B2 * 2/2019 Scholeno ........... H01R 13/6587
2007/0184718 A1 * 8/2007 Akama .............. H01R 13/6585 439/607.05
2024/0250460 A1 * 7/2024 Henry ..................... H01R 12/89
2024/0380153 A1 * 11/2024 Henry .................. H01R 13/502
2025/0125548 A1 * 4/2025 Henry .................... H01R 12/79

* cited by examiner

*Primary Examiner* — Hae Moon Hyeon

(57) ABSTRACT

A card edge connector includes a connector housing having a cavity and a card slot at a front configured to receive a module circuit board of the pluggable module. The card edge connector includes a contact assembly received in the cavity having a contact positioner holding contacts in a contact array. The contacts are arranged in pairs. Each contact includes a mating end, a terminating end, and an intermediate portion held by the contact positioner. The mating ends extend into the card slot for mating to corresponding signal pads on the module circuit board. The card edge connector includes a shield structure having ground shields located between the pairs of the contacts. The ground shields include ground beams that extend into the card slot for mating to corresponding ground pads on the module circuit board.

19 Claims, 8 Drawing Sheets

SHIELDING STRUCTURE FOR A CARD EDGE CONNECTOR

BACKGROUND OF THE INVENTION

The subject matter herein relates generally to card edge connectors of communication systems.

Some communication systems utilize communication connectors, such as card edge connectors to interconnect various components of the system for data communication. Some known communication systems use pluggable modules, such as I/O modules or circuit cards, which are electrically connected to the card edge connectors. The pluggable modules have module circuit boards having card edges that are mated with the card edge connectors during the mating operation. Each card edge connector typically has an upper row of contacts and a lower row of contact for mating with the corresponding circuit board.

Known card edge connectors are not without disadvantages. For instance, at high data rates, signal performance of known electrical connectors may be inadequate. For example, cross-talk and return loss affect the signal integrity at high data rates. Known electrical connectors provide ground contacts between signal contacts. However, the ground contacts may be ineffective at providing adequate shielding for the signal contacts, particularly at high data rates.

A need remains for a reliable card edge connector.

BRIEF DESCRIPTION OF THE INVENTION

In one embodiment, a card edge connector for mating with a pluggable module is provided and includes a connector housing including a top and a bottom. The housing has a front and a rear. The housing has a first side and a second side. The connector housing includes a cavity extending between the front and the rear. The connector housing includes a card slot at the front configured to receive a module circuit board of the pluggable module. The card edge connector includes a contact assembly received in the cavity. The contact assembly has a contact positioner holding contacts in a contact array. The contacts are arranged in pairs in the contact array. Each contact includes a mating end, a terminating end, and an intermediate portion between the mating end and the terminating end. The intermediate portion held by the contact positioner. The mating ends extend into the card slot for mating to corresponding signal pads on the module circuit board. The card edge connector includes a shield structure coupled to the contact assembly. The shield structure includes ground shields located between the pairs of the contacts. The ground shields include ground beams that extend into the card slot for mating to corresponding ground pads on the module circuit board.

In another embodiment, a card edge connector for mating with a pluggable module is provided and includes a connector housing including a top and a bottom. The housing has a front and a rear. The housing has a first side and a second side. The connector housing includes a cavity extending between the front and the rear. The connector housing includes a card slot at the front configured to receive a module circuit board of the pluggable module. The card edge connector includes a contact assembly received in the cavity. The contact assembly has a contact positioner holding contacts in a contact array. The contacts are arranged in pairs in the contact array. Each contact includes a mating end, a terminating end, and an intermediate portion between the mating end and the terminating end. The intermediate portion held by the contact positioner. The mating ends extend into the card slot for mating to corresponding signal pads on the module circuit board. The card edge connector includes a shield structure coupled to the contact assembly. The shield structure includes ground shields located between the pairs of the contacts. The ground shields include ground beams that extend into the card slot for mating to corresponding ground pads on the module circuit board. The ground shields include shield panels extend along the ground beams.

In a further embodiment, a communication system is provided and includes a pluggable module including a module circuit board having contact pads at a card edge. The communication system includes a card edge connector receiving the pluggable module. The card edge connector includes a connector housing holding a contact assembly and a shield structure. The connector housing includes a top and a bottom. The housing has a front and a rear. The housing has a first side and a second side. The connector housing includes a cavity extending between the front and the rear. The connector housing includes a card slot at the front receiving the card edge of the module circuit board. The contact assembly has a contact positioner holding contacts in a contact array. The contacts are arranged in pairs in the contact array. Each contact includes a mating end, a terminating end, and an intermediate portion between the mating end and the terminating end. The intermediate portion held by the contact positioner. The mating ends extend into the card slot for mating to corresponding signal pads on the module circuit board. The shield structure includes ground shields located between the pairs of the contacts. The ground shields include ground beams that extend into the card slot for mating to corresponding ground pads on the module circuit board.

DETAILED DESCRIPTION OF THE INVENTION

Figure 1:
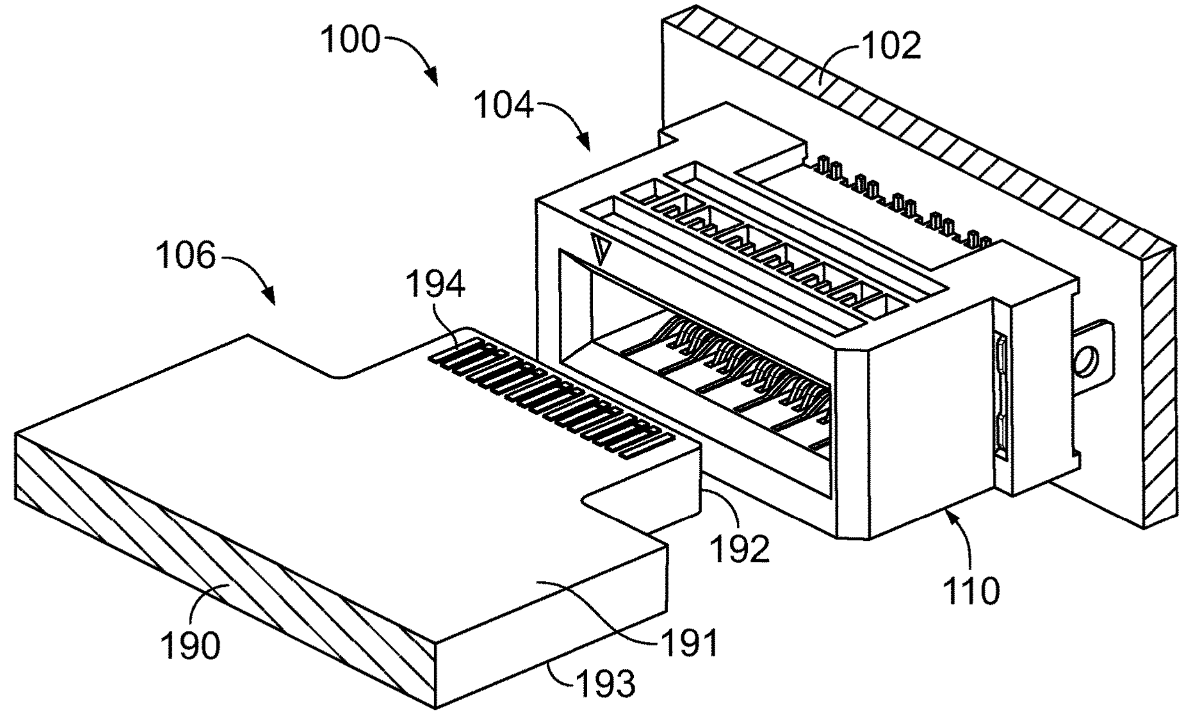
FIG. 1 is a front perspective view of a communication system formed in accordance with an exemplary embodiment including a receptacle connector assembly and a pluggable module.

FIG. 1 is a front perspective view of a communication system 100 formed in accordance with an exemplary embodiment including a receptacle connector assembly 104 and a pluggable module 106 configured to be mated with the receptacle connector assembly 104. FIG. 1 shows the pluggable module 106 poised for mating with the receptacle connector assembly 104 to illustrate the mating interface of the receptacle connector assembly 104. In an exemplary embodiment, the receptacle connector assembly 104 includes a card edge connector 110 configured to receive the pluggable module 106.

In an exemplary embodiment, the communication system 100 includes a host circuit board 102. The card edge connector 110 is mounted to the host circuit board 102. The pluggable module 106 is electrically connected to the host circuit board 102 through the card edge connector 110. However, in alternative embodiments, the card edge connector 110 may be terminated to ends of cables (not shown) rather than the host circuit board 102.

In the illustrated embodiment, the communication system 100 is arranged with the host circuit board 102 oriented perpendicular to the pluggable module 106 and the mating direction of the pluggable module 106 with the card edge connector 110. For example, the host circuit board 102 is oriented vertically and the pluggable module 106 oriented horizontally. Other orientations are possible in alternative embodiments. In the illustrated embodiment, the card edge connector 110 is a straight or pass-through connector with the mating end opposite the terminating end or mounting end. However, in alternative embodiments, the card edge connector 110 may be a right-angle connector with the mating end oriented perpendicular to the terminating/mounting end.

The pluggable module 106 includes a module circuit board 190 having a card edge 192 configured to be plugged into the card edge connector 110. The module circuit board 190 includes an upper surface 191 and a lower surface 193 with the card edge 192 between the surfaces 191, 193. The module circuit board 190 includes contact pads 194 at the card edge 192, such as on both the upper surface 191 and the lower surface 193. The contact pads 194 may be connected to traces, vias or other circuit components of the module circuit board 190.

The pluggable module 106 may include other elements in alternative embodiments, such as a plug housing or plug body that holds and surrounds at least a portion of the module circuit board 190. For example, the module circuit board 190 may be located within a cavity of the plug body and present at the mating end of the plug body for mating with the card edge connector 110. The pluggable module 106 may include a latch or other structure to secure the pluggable module 106 to the card edge connector 110.

The receptacle connector assembly 104 may include other elements in alternative embodiments, such as a receptacle cage that surrounds the card edge connector 110 and that receives the pluggable module 106. The receptacle cage may provide shielding for the card edge connector 110 and the pluggable module 106. The pluggable module 106 may be coupled to the receptacle cage, such as being latchably coupled to the receptacle cage. The receptacle cage may include an elongated channel that receives the pluggable module 106. The receptacle cage may be a shell that surrounds at least a portion of the card edge connector 110.

Figure 2:
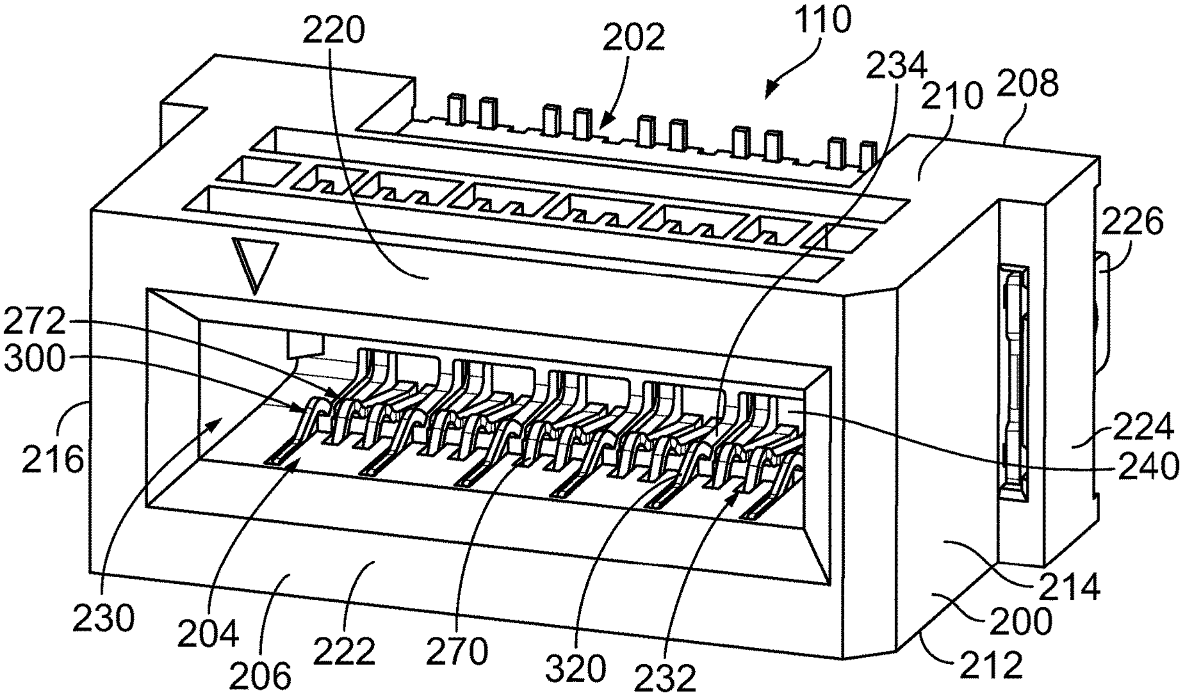
FIG. 2 is a front perspective view of a card edge connector of the receptacle connector assembly in accordance with an exemplary embodiment.

FIG. 2 is a front perspective view of the card edge connector 110 in accordance with an exemplary embodiment. The card edge connector 110 includes a connector housing 200, a contact assembly 202, and a shield structure 300 for providing electrical shielding for the contact assembly 202. The contact assembly 202 is received in a cavity 204 of the connector housing 200.

The connector housing 200 extends between a front 206 and a rear 208. The connector housing 200 extends between a top 210 and a bottom 212. The connector housing 200 extends between opposite sides 214, 216. The connector housing 200 may be generally box shaped in various embodiments. In the illustrated embodiment, the rear 208 defines a mounting end configured to be mounted to the host circuit board 102 (shown in FIG. 1) and the front 206 defines the mating end configured to be mated with the pluggable module 106 (shown in FIG. 1). Other orientations are possible in alternative embodiments, such as with the mounting end at the bottom 212 (for example, right-angle connector).

The connector housing 200 includes a top wall 220 at the top 210 and a bottom wall 222 at the bottom 212. The cavity 204 is defined between the top wall 220 and the bottom wall 222. The cavity 204 is open at the front 206 to receive the module circuit board 190. In an exemplary embodiment, the cavity 204 is open at the rear 208 to receive the contact assembly 202. However, the cavity 204 may be open at the bottom to receive the contact assembly 202, such as when the card edge connector 110 is a right-angle connector.

In an exemplary embodiment, the connector housing 200 includes mounting brackets 224 for mounting the card edge connector 110 to the host circuit board 102. The mounting brackets 224 may be located at the sides 214, 216, such as at the rear 208 of the connector housing 200. Other locations are possible in alternative embodiments.

In an exemplary embodiment, connector mounts 226 are coupled to the mounting bracket 224. The connector mounts 226 are used to mount the card edge connector 110 to the host circuit board 102. In the illustrated embodiment, the connector mounts 226 include solder tabs configured to be soldered to the host circuit board 102. Other types of connector mounts 226 may be used in alternative embodiments, such as threaded fasteners, clips, or other mounting features.

In an exemplary embodiment, the connector housing 200 includes a card slot 230 configured to receive the module circuit board 190. The walls of the connector housing 200 surround the card slot 230. For example, the card slot 230 is defined between the top wall 220 and the bottom wall 222. The card slot 230 is open at the front 206 to receive the module circuit board 190. In an exemplary embodiment, the connector housing 200 includes lead-in surfaces at the front

206 to guide the module circuit board 190 into the card slot 230. The height of the card slot 230 (between the top and bottom walls 220, 222) may be approximately equal to a thickness of the module circuit board 190 to vertically position the module circuit board 190 in the card slot 230. The width of the card slot 230 (between the side walls) may be approximately equal to the width of the plug portion of the module circuit board 190 to horizontally position the module circuit board 190 in the card slot 230.

In an exemplary embodiment, the connector housing 200 includes contact channels 232 within the cavity 204. The contact channels 232 are located within the card slot 230. The contact channels 232 are configured to receive contacts of the contact assembly 202. The contact channels 232 may be provided at the top wall 220 and the bottom wall 222 to receive upper and lower rows of the contacts, respectively. The connector housing 200 includes separating walls 234 between the contact channels 232 for locating the contacts of the contact assembly 202 relative to each other within the cavity 204, such as to align the contacts with corresponding contact pads on the host circuit board 102.

The contact assembly 202 includes a contact positioner 240 holding contacts 270 arranged in a contact array 272. Optionally, the contacts 270 may be arranged in an upper array and a lower array to mate with opposite sides of the module circuit board 190. The contacts 270 extend from the contact positioner 240 into the card slot 230. The contacts 270 are received in corresponding contact channels 232. In various embodiments, the contacts 270 are arranged in pairs configured to convey differential signals. The shield structure 300 provides electrical shielding for the contact assembly 202. For example, the shield structure 300 may be located between the pairs of the contacts 270. The shield structure 300 may be located between the upper and lower contact arrays. In an exemplary embodiment, the shield structure 300 includes ground beams 320 configured to be connected to the module circuit board 190. The ground beams 320 may be received in corresponding contact channels 232.

Figure 3:
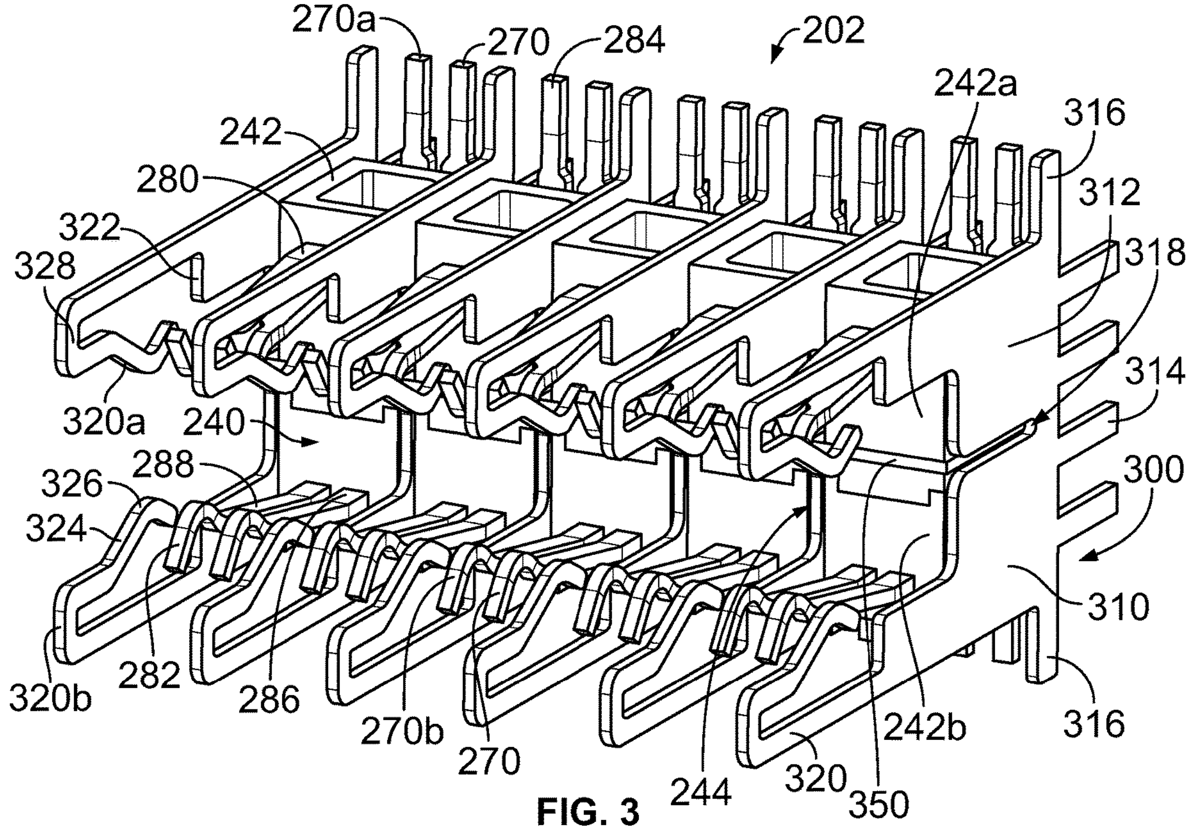
FIG. 3 is a front perspective view of a contact assembly and a shield structure of the card edge connector in accordance with an exemplary embodiment.
Figure 4:
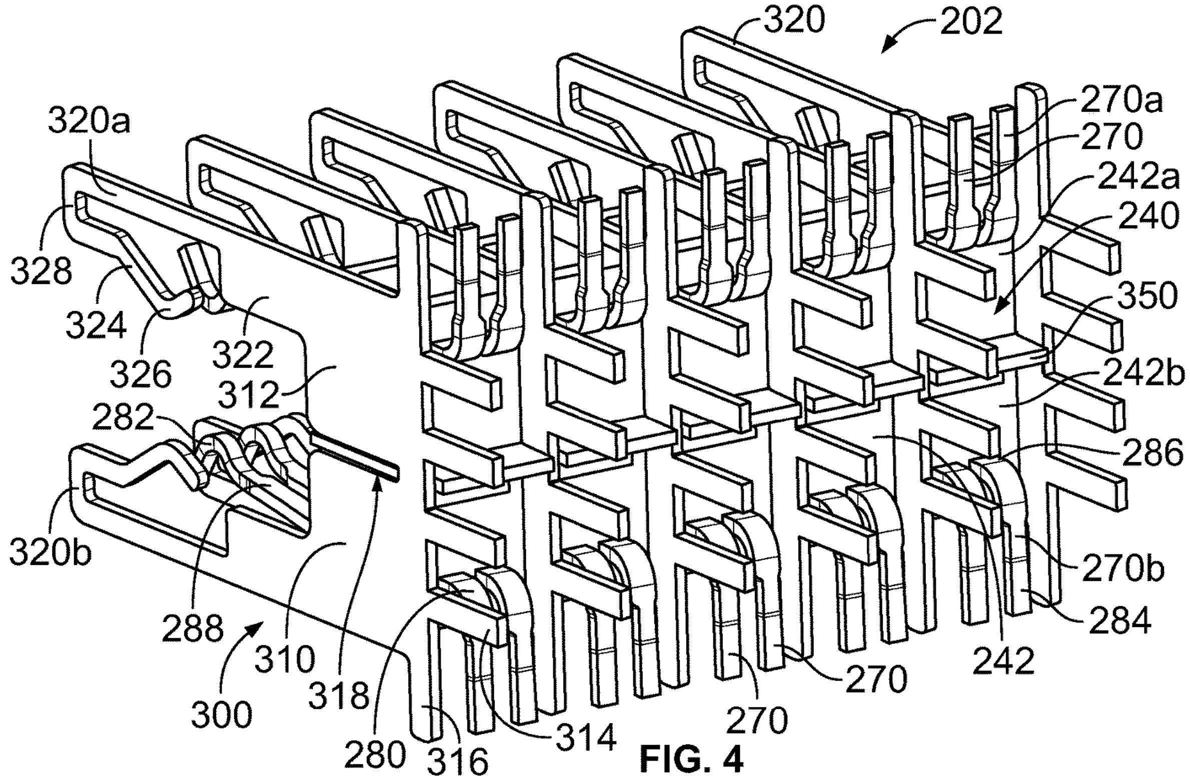
FIG. 4 is a rear perspective view of the contact assembly and the shield structure in accordance with an exemplary embodiment.

FIG. 3 is a front perspective view of the contact assembly 202 and the shield structure 300 in accordance with an exemplary embodiment. FIG. 4 is a rear perspective view of the contact assembly 202 and the shield structure 300 in accordance with an exemplary embodiment.

The contact assembly 202 includes the contact positioner 240 and the contacts 270. The contact positioner 240 includes one or more contact holders 242 that hold the corresponding contacts 270. The contact holders 242 may be overmolded over the corresponding contacts 270. In an exemplary embodiment, each contact holder 242 holds a pair of the contacts 270. The contact holders 242 are separate and discrete from each other, but may be coupled together or coupled to another structure, such as the shield structure, to position the contact holders 242 within the contact assembly 202. In various embodiments, the contact holders 242 includes upper contact holders **242*a* holding the upper contacts and lower contact holders 242*b* holding the lower contacts. In an exemplary embodiment, the contact holders 242 are separated by gaps 244. The shield structure 300 is received in the gaps 244, such as to provide electrical shielding between the corresponding contacts 270, such as between the pairs of the contacts 270. However, in alternative embodiments, the contact positioner 240 may include a single contact holder 242 holding all of the contacts 270**, or a pair of contact holders, such as an upper contact holder holding all of the upper contacts and a lower contact holder holding all of the lower contacts.

In an exemplary embodiment, the contacts 270 may be stamped and formed contacts stamped from a lead frame. The contacts 270 may be arranged in one or more rows, such as an upper row of upper contacts **270*a* and a lower row of lower contacts 270*b*. The upper contacts 270*a* and the lower contacts 270*b* may be identical, however may be oriented differently within the contact assembly 202** (for example, downward facing versus upward facing).

Each contact 270 includes a contact body 280 having a mating end 282, a terminating end 284, and an intermediate portion 286 between the mating end 282 and the terminating end 284. The intermediate portion 286 is held by the contact holder 242 of the contact positioner 240. For example, the intermediate portion 286 may be overmolded by the contact holder 242. The intermediate portion 286 may extend rearward of the contact holder 242 to the terminating end 284 and/or forward of the contact holder 242 to the mating end 282. In an exemplary embodiment, the intermediate portion 286 is angled inward (for example, toward a center plane of the contact assembly 202) from the contact holder 242 to the mating end 282. For example, the intermediate portion 286 of the upper contact **270*a* is tapered downward whereas the intermediate portion 286 of the lower contact 270*b*** is tapered upward.

The terminating end 284 is configured to be terminated to the host circuit board 102 (or a conductor of the corresponding cable). For example, the terminating end 284 may include a solder pad configured to be soldered to the host circuit board 102 (or the conductor of the corresponding cable). In alternative embodiments, the terminating end 284 may include a compliant pin configured to be press-fit into the host circuit board 102. In the illustrated embodiment, the terminating end 284 is bent approximately 90° relative to the intermediate portion 286 such that a surface of the contact 270 at the terminating end 284 is configured to be soldered to the host circuit board 102. Such surfaces may be co-planer within the contact array.

The mating end 282 is provided at the front of the contact 270. In an exemplary embodiment, the contact 270 includes a spring beam 288 at the mating end 282. The spring beam 288 is flexible and configured to be deflected when mated with the module circuit board 190. The spring beam 288 includes a mating interface for the mating end 282 configured to engage and electrically connect to the corresponding contact pad 194 at the card edge 192 of the module circuit board 190. In an exemplary embodiment, the mating end 282 is curved to include a lead-in at the distal tip for mating with the module circuit board 190. However, in alternative embodiments, the mating end may be generally flat at the distal tip to eliminate the lead-in and thus reduce electrical stub.

In an exemplary embodiment, the shield structure 300 includes a plurality of ground shields 310 and a connecting plate 350 electrically connecting each of the ground shields 310. The ground shields 310 and the connecting plate 350 provide shielding for the contacts 270, such as between the pairs of the contacts 270. For example, the connecting plate 350 may be located between the upper contacts **270*a* and the lower contacts 270*b*. Optionally, multiple connecting plates 350 may be provided, such as along the top of the contact assembly 202 and the bottom of the contact assembly 202. In the illustrated embodiment, the ground shields 310 provide horizontal shielding (in a horizontal direction) whereas the connecting plate 350 provides vertical shielding (in a vertical direction). The connecting plate 350** may be a stamped and formed part.

Each ground shield 310 may be a stamped and formed part. The ground shield 310 includes a ground plate 312 and at least one of the ground beams 320. The ground plates 312 are configured to provide electrical shielding between corresponding contacts 270 of the contact assembly 202, such as between pairs of the contacts 270. The ground plate 312 is coupled to the contact positioner 240, such as being received in the gaps 244. The ground plate 312 is configured to be coupled to the connecting plate 350.

In an exemplary embodiment, each ground plate 312 includes a plurality of pins 314 configured to be electrically connected to the host circuit board 102. For example, the pins 314 may be solder pins or press-fit pins configured to be electrically connected to the host circuit board 102. In various embodiments, the pins 314 may be eye-of-the-needle pins. The pins 314 are provided at the rear edge of the ground plate 312 in the illustrated embodiment.

In an exemplary embodiment, the ground plate 312 includes shield tabs 316 at the rear end of the ground plate 312. The shield tabs 316 extend from the top and the bottom of the ground plate 312. The shield tabs 316 are configured to be located between the terminating ends 284 of the contacts 270, such as between the solder tails.

In an exemplary embodiment, the ground plate 312 includes a ground plate slot 318 configured to receive the connecting plate 350. In various embodiments, the ground plate 312 includes interference bumps (not shown) extending into the ground plate slot 318 to create an interference fit with the connecting plate 350. The ground plate slot 318 may be open at a front edge of the ground plate 312. The ground plate slot 318 may be approximately centered between a top and a bottom of the ground plate 312. The ground plate 312 includes an upper portion above the ground plate slot 318 and a lower portion below the ground plate slot 318. The upper portion of the ground plate 312 is located between the pairs of the upper contacts 270*a* to provide shielding between the pairs of the upper contacts 270*a*. The lower portion of the ground plate 312 is located between the pairs of the lower contacts 270*b* to provide shielding between the pairs of the lower contacts 270*b*.

In the illustrated embodiment, each ground shield 310 includes a pair of the ground beams 320, such as an upper ground beam 320*a* and a lower ground beam 320*b*. The ground beams 320 provide shielding along the mating ends 282 of the contacts 270. Each ground beam 320 extends forward of the ground plate 312. The ground beam 320 includes an inner panel 322 and an outer spring beam 324 extending forward of the inner panel 322. The spring beam 324 is deflectable. The spring beam 324 includes a bump 326 defining a mating interface. The mating interface is configured to be coupled to the module circuit board 190. In the illustrated embodiment, the ground beam 320 includes a wrapped portion 328. For example, the spring beam 324 is wrapped inwardly to interface with the module circuit board 190. The wrapped portion 328 is provided at the front of the ground beam 320 in the illustrated embodiment. The spring beam 324 extends rearwardly back toward the inner panel 322 and the ground plate 312. The inner panel 322 and the spring beam 324 extend along different sections of the mating ends 282 and provide shielding for the mating ends 282 of the contacts 270.

Figure 5:
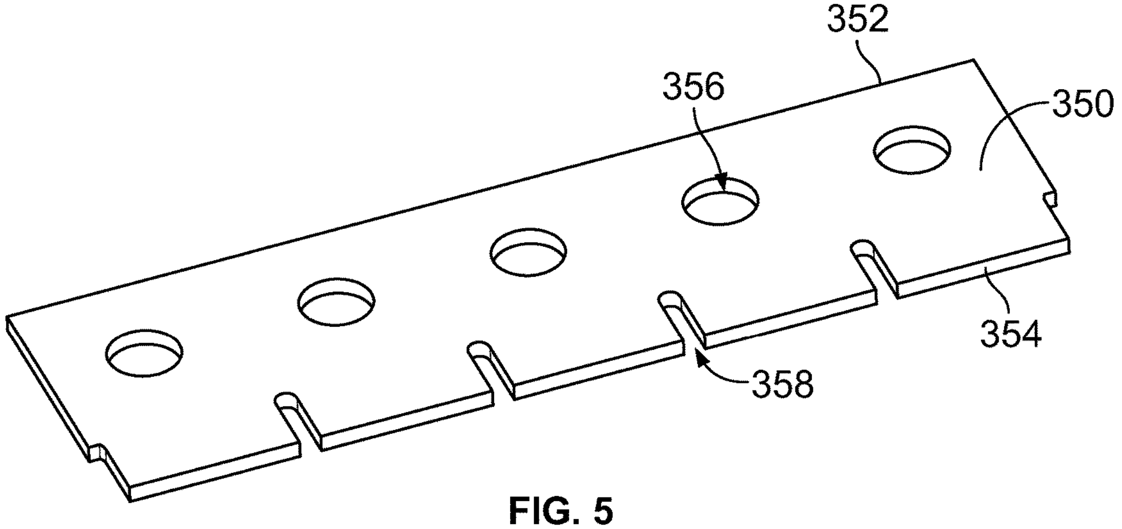
FIG. 5 is a rear perspective view of a connecting plate of the shield structure in accordance with an exemplary embodiment.

FIG. 5 is a rear perspective view of the connecting plate 350 of the shield structure in accordance with an exemplary embodiment. The connecting plate 350 includes a plate-like body having planar upper and lower surfaces. The connecting plate 350 extends between a front 352 and a rear 354. The connecting plate 350 includes openings 356 passing therethrough. Portions of the contact positioner 240, such as the contact holders 270 may pass through the openings 356.

The connecting plate 350 includes connecting plate slots 358 configured to receive the ground plates 312 (shown in FIGS. 3 and 4). The connecting plate slot 358 may be open at the rear 354 of the connecting plate 350. In various embodiments, the connecting plate 350 includes interference bumps (not shown) extending into the connecting plate slots 358 to create an interference fit with the ground plates 312. The connecting plate 350 may include other connecting features to mechanically and/or electrically connect the connecting plate 350 to the ground plates 312.

Figure 6:
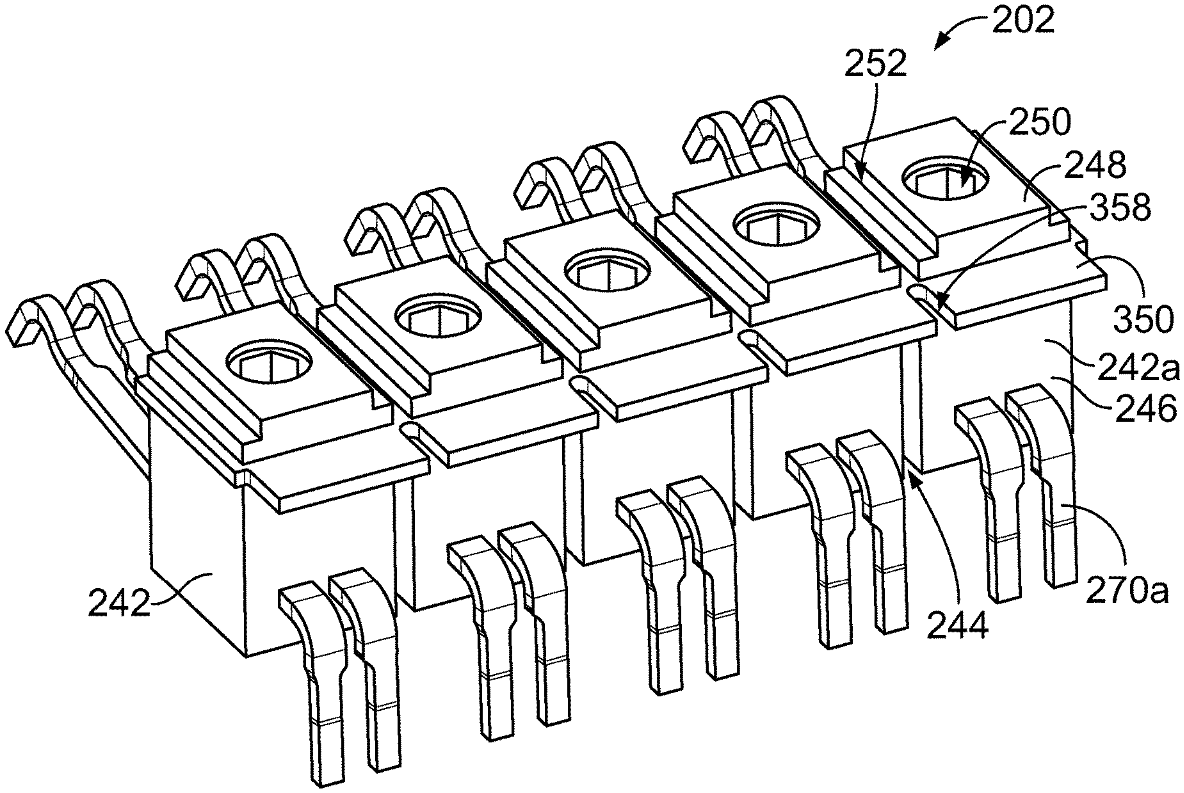
FIG. 6 is a bottom perspective view of a portion of the contact assembly in accordance with an exemplary embodiment.

FIG. 6 is a bottom perspective view of a portion of the contact assembly 202 in accordance with an exemplary embodiment, showing a plurality of the contact holders 242 coupled to the connecting plate 350. FIG. 6 shows upper contact holders 242*a*. In an exemplary embodiment, the upper contact holders 242*a* are molded parts. The upper contact holders 242*a* may be overmolded over the corresponding upper contacts 270*a*. In an exemplary embodiment, the upper contact holders 242*a* may be formed in situ on the connecting plate 350. For example, the upper contact holders 242*a* may be molded to the connecting plate 350. The connecting plate 350 holds the relative positions of the upper contact holders 242*a* relative to each other. The upper contact holders 242*a* are molded relative to each other to form the gaps 244 between the upper contact holders 242*a*. The connecting plate 350 spans across the gaps 244. Optionally, the connecting plate slots 358 are aligned with the gaps 244.

In an exemplary embodiment, each upper contact holder 242*a* includes an upper portion 246 above the connecting plate 350 and a lower portion 248 below the connecting plate 350. The upper portion 246 holds the contacts 270*a*. The upper portion 246 is overmolded over the contacts 270*a*. In an exemplary embodiment, the plastic material of the upper contact holder 242*a* passes through the corresponding opening 356 to form the upper portion 246 and the lower portion 248.

Figure 7:
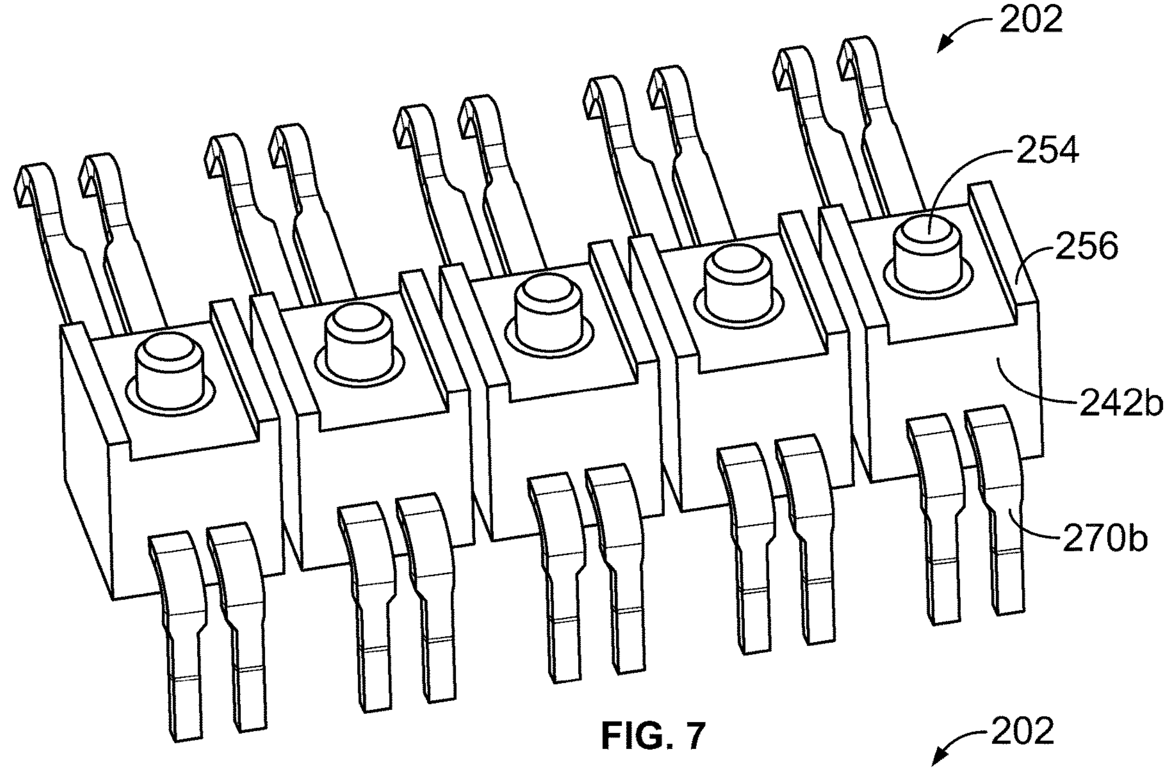
FIG. 7 is a top perspective view of a portion of the contact assembly in accordance with an exemplary embodiment.

In an exemplary embodiment, the upper contact holders 242*a* includes connecting features 250 for connecting the upper contact holders 242*a* to the corresponding lower contact holders 242*b* (shown in FIG. 7). In the illustrated embodiment, the connecting features 250 are openings. Other types of connecting features may be used in alternative embodiments, such as posts, clips, latches, or other connecting features.

In an exemplary embodiment, the upper contact holders 242*a* includes alignment features 252 for positioning the upper contact holders 242*a* relative to the corresponding lower contact holders 242*b*. In the illustrated embodiment, the alignment features 252 are grooves or channels formed in the lower portion 248. Other types of alignment features may be used in alternative embodiments.

FIG. 7 is a top perspective view of a portion of the contact assembly 202 in accordance with an exemplary embodiment. FIG. 7 shows lower contact holders 242*b*. In an exemplary embodiment, the lower contact holders 242*b* are molded parts. The lower contact holders 242*b* may be overmolded over the corresponding lower contacts 270*b*. In various embodiments, the lower contact holders 242*b* may be formed in situ on a connecting plate (not shown).

In an exemplary embodiment, the lower contact holders 242*b* include connecting features 254 for connecting the lower contact holders 242*b* to the corresponding upper contact holders 242*a* (shown in FIG. 6). In the illustrated embodiment, the connecting features 254 are posts. Other types of connecting features may be used in alternative embodiments, such as openings, clips, latches, or other connecting features.

In an exemplary embodiment, the upper contact holders 242*a* includes alignment features 256 for positioning the lower contact holders 242*b* relative to the corresponding upper contact holders 242*a*. In the illustrated embodiment, the alignment features 256 are ribs extending from the upper surface of the lower contact holders 242*b*. Other types of alignment features may be used in alternative embodiments.

Figure 8:
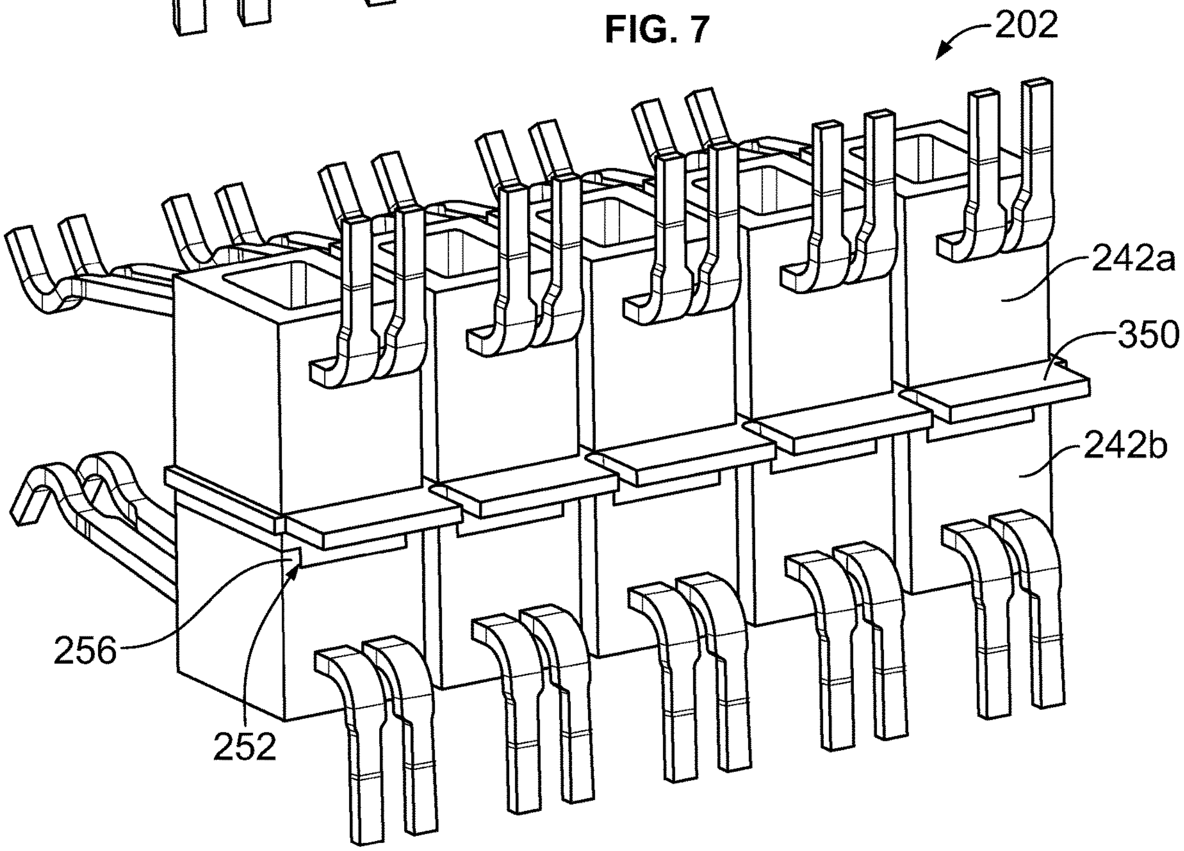
FIG. 8 is a rear perspective view of a portion of the contact assembly in accordance with an exemplary embodiment.

FIG. 8 is a rear perspective view of a portion of the contact assembly 202 in accordance with an exemplary embodiment showing the upper contact holders 242*a* coupled to the lower contact holders 242*b*. The connecting features 250, 254 (shown in FIGS. 6 and 7, respectively) are connected together to secure the upper contact holders 242*a* to the lower contact holders 242*b*. The alignment features 252, 256 interface with each other to orient the upper contact holders 242*a* relative to the lower contact holders 242*b*. When assembled, the connecting plate 350 holds the upper and lower contact holders 242*a*, 242*b* relative to other upper and lower contact holders 242*a*, 242*b*.

Figure 9:
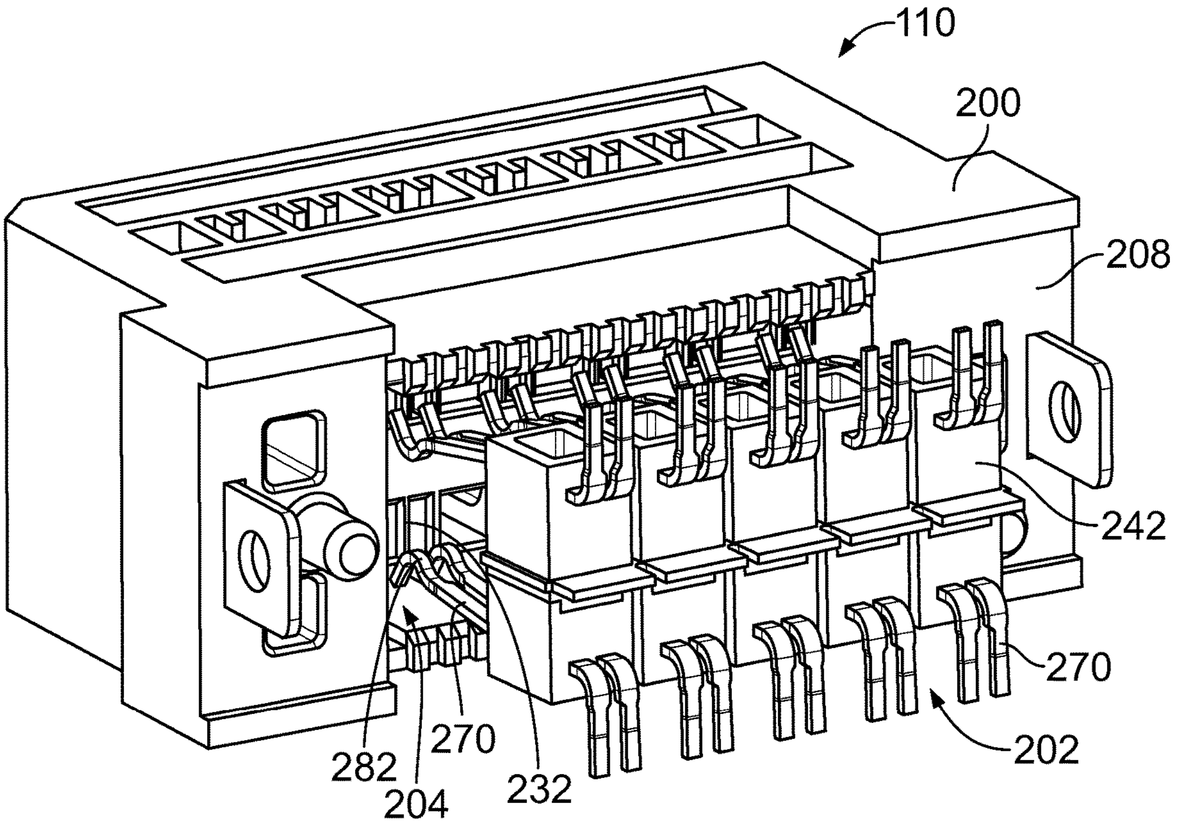
FIG. 9 is a rear perspective view of a portion of the card edge connector showing the contact assembly poised for loading into the connector housing in accordance with an exemplary embodiment.
Figure 10:
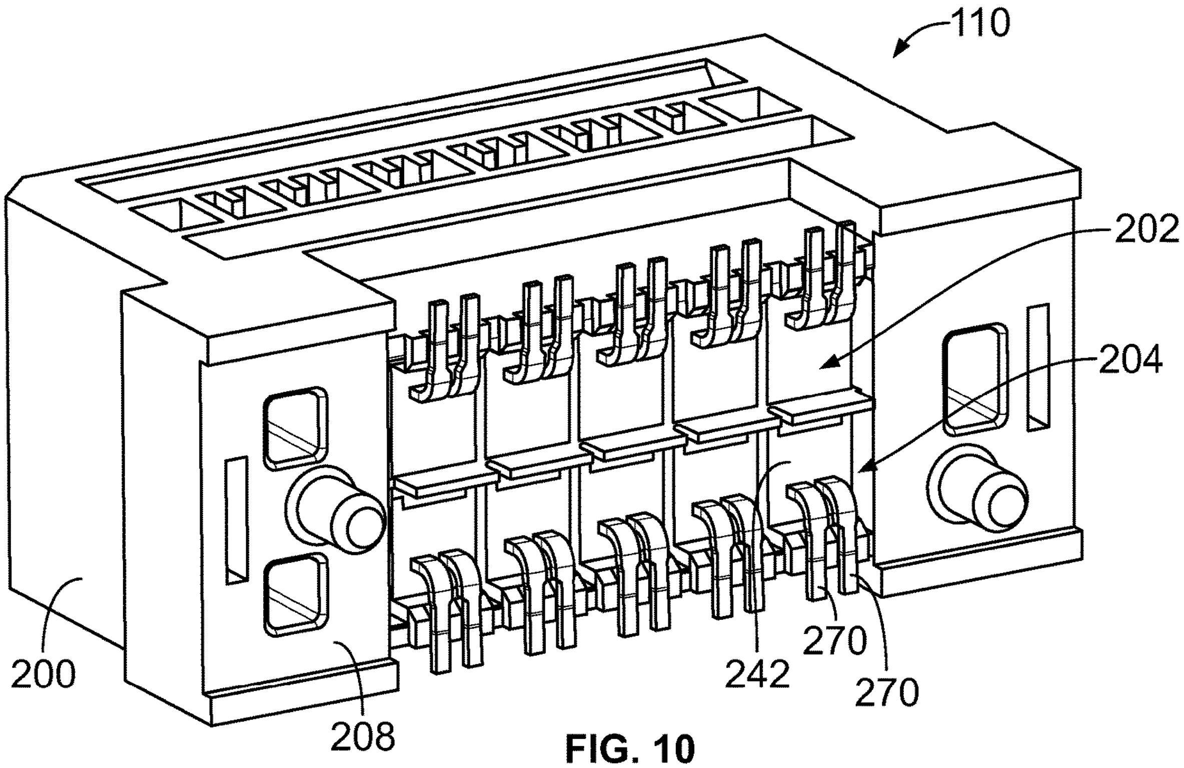
FIG. 10 is a rear perspective view of a portion of the card edge connector showing the contact assembly loaded into the connector housing in accordance with an exemplary embodiment.

FIG. 9 is a rear perspective view of a portion of the card edge connector 110 showing the contact assembly 202 poised for loading into the connector housing 200. FIG. 10 is a rear perspective view of a portion of the card edge connector 110 showing the contact assembly 202 loaded into the connector housing 200. In an exemplary embodiment, the contact assembly 202 is loaded into the cavity 204 through the rear 208. The mating ends 282 of the contacts 270 extend forward of the contact holders 242 and are configured to be received in the contact channels 232 of the connector housing 200. The mating ends 282 are configured to be located in the card slot 230 to mate with the module circuit board 190 (shown in FIG. 1).

Figure 11:
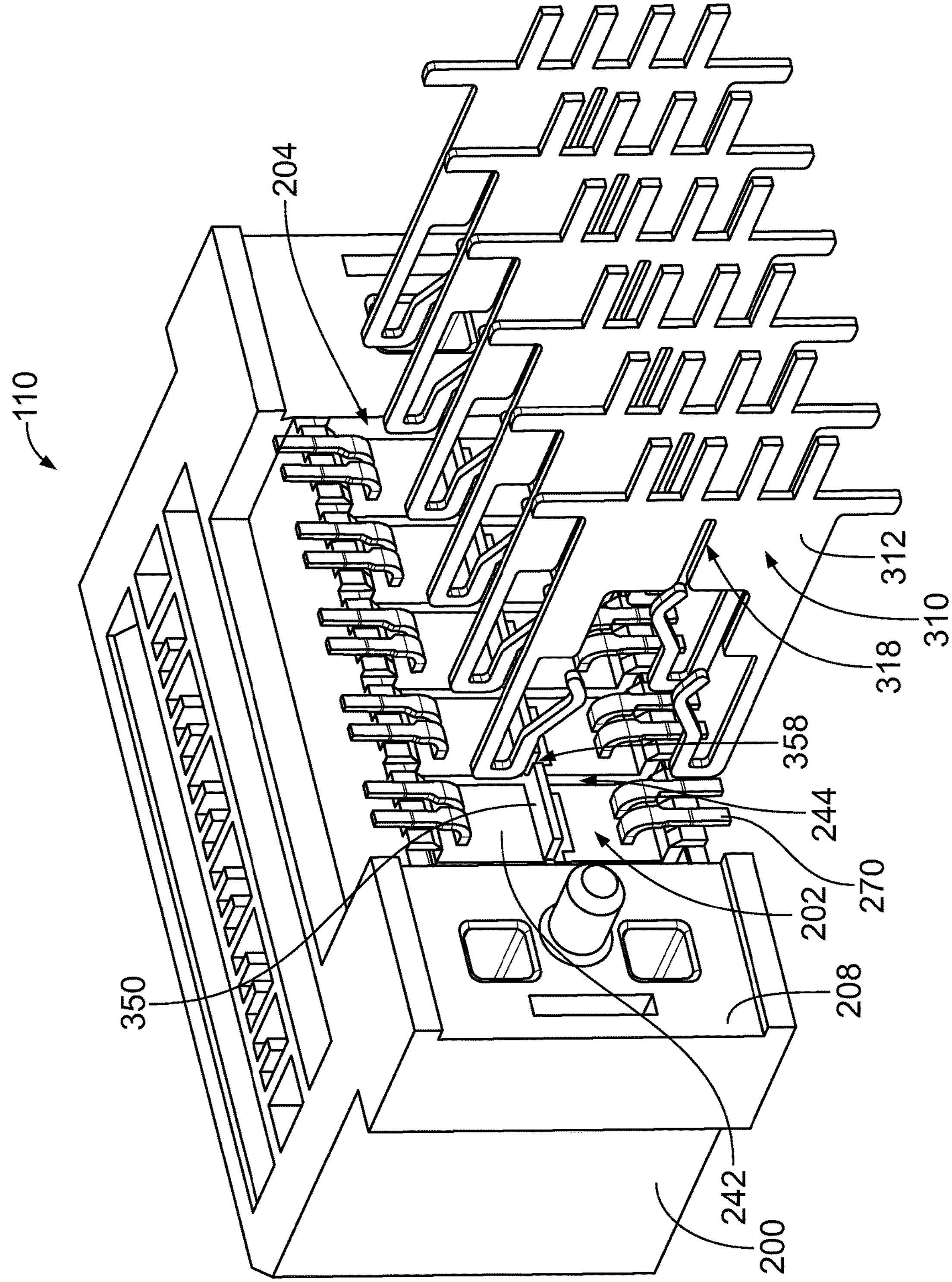
FIG. 11 is a rear perspective view of a portion of the card edge connector showing the ground shields poised for loading into the connector housing in accordance with an exemplary embodiment.

FIG. 11 is a rear perspective view of a portion of the card edge connector 110 showing the contact assembly 202 loaded into the connector housing 200 and showing the ground shields 310 poised for loading into the connector housing 200. In an exemplary embodiment, the ground shields 310 are configured to be loaded into the cavity 204 through the rear 208. The ground shields 310 are configured to be loaded into corresponding gaps 244 between the contact holders 242. The ground shields 310 are configured to be coupled to the connecting plate 350. For example, the connecting plate 350 may be received in the ground plate slots 318 of the ground plates 312 and/or the ground plates 312 may be received in the connecting plate slots 358 of the connecting plate 350. When assembled, the connecting plate 350 and the ground plates 312 form shield boxes around each pair of the contacts 270 to shield the pairs of the contacts 270 from other pairs of the contacts 270.

Figure 12:
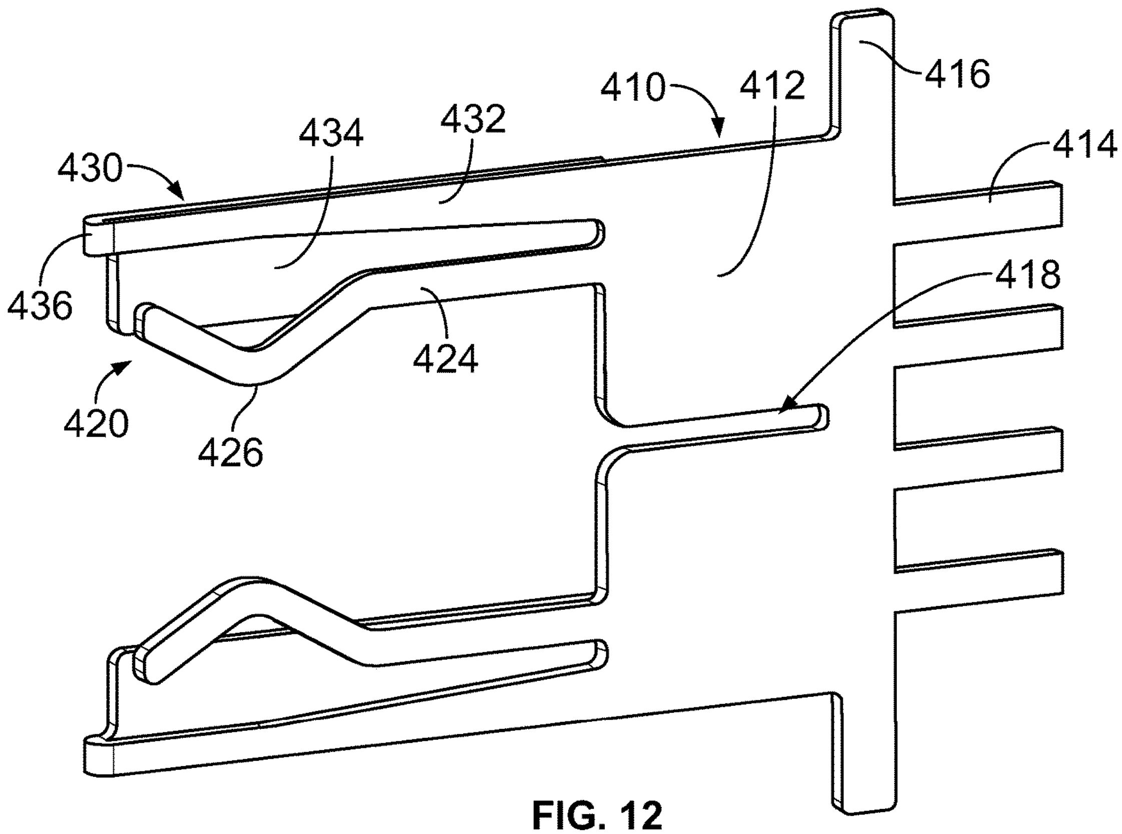
FIG. 12 is a front perspective view of a ground shield in accordance with an exemplary embodiment.
Figure 13:
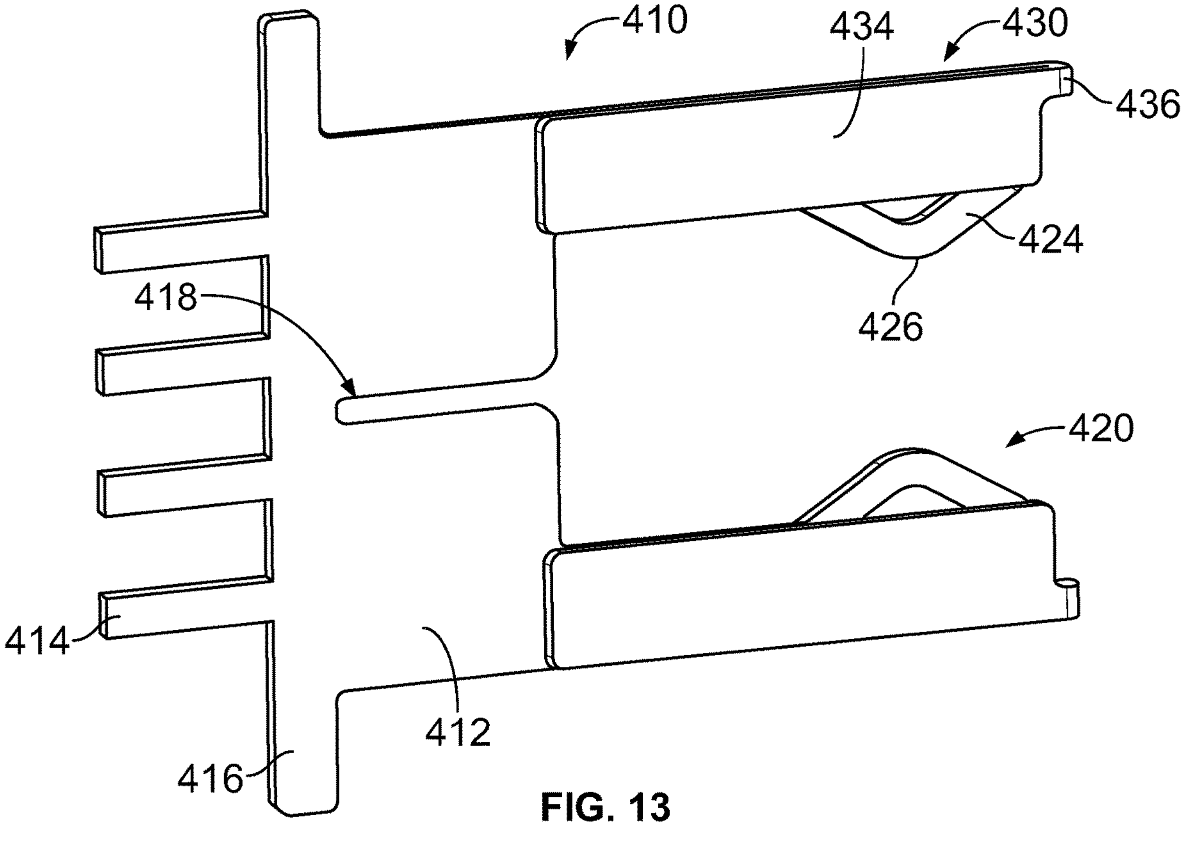
FIG. 13 is a rear perspective view of the ground shield in accordance with an exemplary embodiment.

FIG. 12 is a front perspective view of a ground shield 410 in accordance with an exemplary embodiment. FIG. 13 is a rear perspective view of the ground shield 410 in accordance with an exemplary embodiment. The ground shield 410 is similar to the ground shield 310 shown in FIGS. 3 and 4; however, the ground shield 410 includes ground beams 420 having different shapes than the ground beams 320. The ground shield 410 may be used in place of the ground shield 310, such as being coupled to the contact positioner 240 in the gaps 244 (both shown in FIGS. 3 and 4). The ground shield 410 is configured to be coupled to the connecting plate 350 (shown in FIG. 5).

The ground shield 410 may be a stamped and formed part. The ground shield 410 includes a ground plate 412 and at least one of the ground beams 420. The ground plate 412 is configured to provide electrical shielding between corresponding contacts 270 of the contact assembly 202 (both FIGS. 3 and 4), such as between pairs of the contacts 270.

In an exemplary embodiment, the ground plate 412 includes a plurality of pins 414 configured to be electrically connected to the host circuit board 102. For example, the pins 414 may be solder pins or press-fit pins configured to be electrically connected to the host circuit board 102. In various embodiments, the pins 414 may be eye-of-the-needle pins. The pins 414 are provided at the rear edge of the ground plate 412 in the illustrated embodiment.

In an exemplary embodiment, the ground plate 412 includes shield tabs 416 at the rear end of the ground plate 412. The shield tabs 416 extend from the top and the bottom of the ground plate 412.

In an exemplary embodiment, the ground plate 412 includes a ground plate slot 418 configured to receive the connecting plate 350. In various embodiments, the ground plate 412 includes interference bumps (not shown) extending into the ground plate slot 418 to create an interference fit with the connecting plate 350. The ground plate slot 418 may be open at a front edge of the ground plate 412. The ground plate slot 418 may be approximately centered between a top and a bottom of the ground plate 412. The ground plate 412 includes an upper portion above the ground plate slot 418 and a lower portion below the ground plate slot 418.

In the illustrated embodiment, the ground shield 410 includes a pair of the ground beams 420, such as an upper ground beam and a lower ground beam. The ground beams 420 provide shielding along the mating ends 282 of the contacts 270. Each ground beam 420 extends forward of the ground plate 412. The ground beam 420 includes a spring beam 424 cantilevered from a front edge of the ground plate 412. The spring beam 424 is deflectable. The spring beam 424 includes a bump 426 defining a mating interface. The mating interface is configured to be coupled to the module circuit board 190.

In an exemplary embodiment, the ground shield 410 includes shield panels 430 associated with the ground beams 420. The shield panels 430 provide shielding along the ground beams 420. The shield panels 430 are wider than the ground beams 420 and define a shield wall along and covering the ground beams 420. The shield panels 430 may be located above and/or below the corresponding ground beams 420. In an exemplary embodiment, the shield panels 430 cover the bumps 426 (for example, when the spring beams 424 are deflected outward, the bumps are covered by the shield panels 430. The shield panels 430 may interface with the module circuit board 190. In the illustrated embodiment, the shield panel 430 includes an inner support arm 432 and an outer shield arm 434 extending from and supported by the inner support arm 432. The shield panel 430 includes a wrapped portion 436 between the inner support arm 432 and the outer shield arm 434. For example, the shield panel 430 is folded over at the wrapped portion 436. For example, the inner support arm 432 extends forwardly and the outer shield arm 434 extends rearwardly. The inner support arm 432 is coplanar with the spring beam 424 whereas the outer shield arm 434 is offset from the ground beam 420 and the support arm 432. The distal tip of the outer shield arm 434 may be aligned with the ground plate 412 to provide coverage along the entire length of the ground beam 420.

Figure 14:
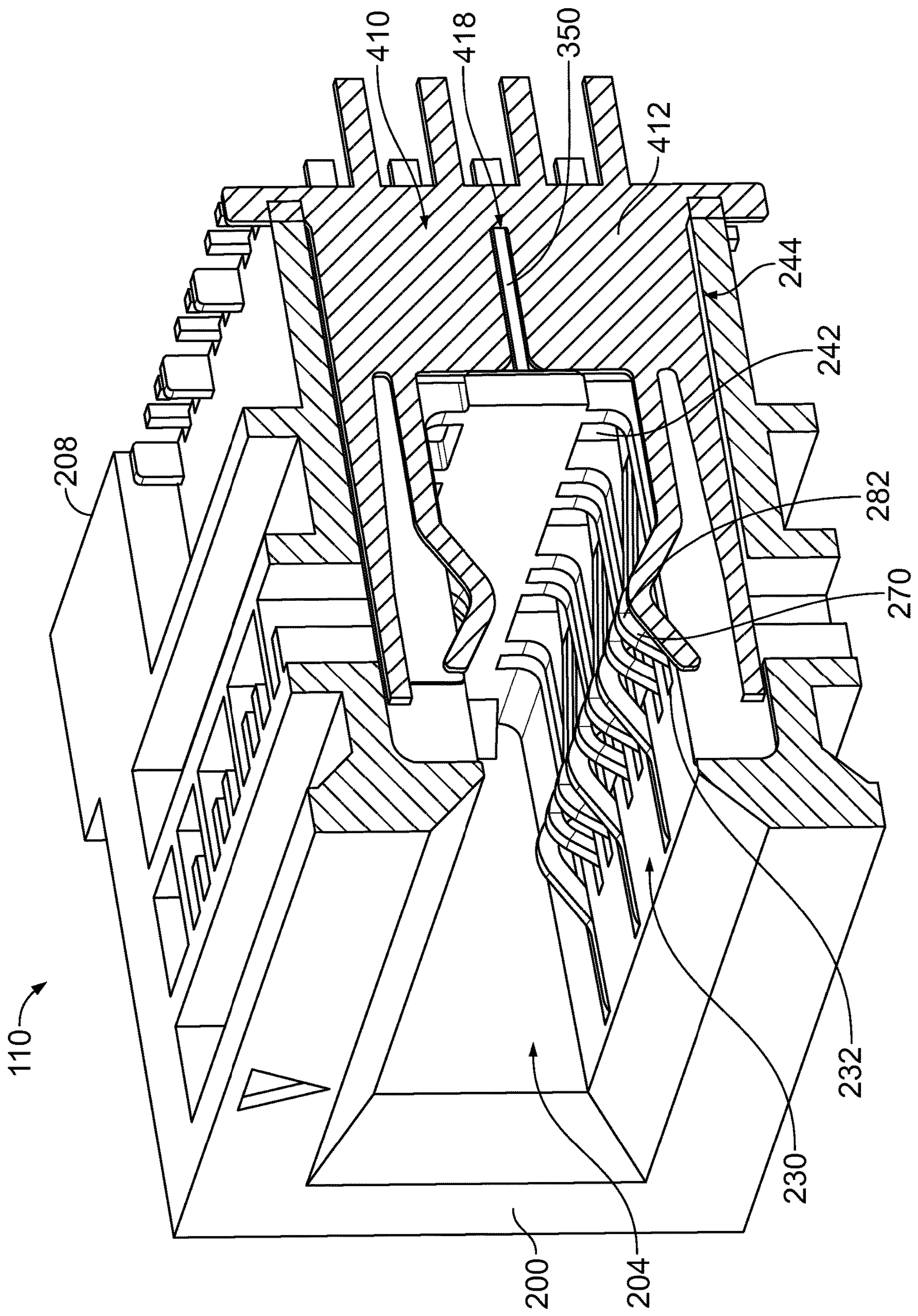
FIG. 14 is a front perspective, partial sectional view of the card edge connector in accordance with an exemplary embodiment.

FIG. 14 is a front perspective, partial sectional view of the card edge connector 110 in accordance with an exemplary embodiment showing the contact assembly 202 and the ground shields 410 loaded into the connector housing 200.

In an exemplary embodiment, the contact assembly 202 is loaded into the cavity 204 through the rear 208. The mating ends 282 of the contacts 270 extend forward of the contact holders 242 and are received in the contact channels 232 of the connector housing 200. The mating ends 282 are located in the card slot 230, such as above and below the card slot 230, to mate with the module circuit board 190 (shown in FIG. 1).

In an exemplary embodiment, the ground shields 410 are configured to be loaded into the cavity 204 through the rear 208. The ground shields 410 are configured to be loaded into corresponding gaps 244 between the contact holders 242. The ground shields 410 are configured to be coupled to the connecting plate 350. For example, the connecting plate 350 may be received in the ground plate slots 418 of the ground plates 412 and/or the ground plates 412 may be received in the connecting plate slots 358 (FIG. 5) of the connecting plate 350. When assembled, the connecting plate 350 and the ground plates 412 form shield boxes around each pair of the contacts 270 to shield the pairs of the contacts 270 from other pairs of the contacts 270.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A card edge connector for mating with a pluggable module, the card edge connector comprising:

a connector housing including a top and a bottom, the connector housing having a front and a rear, the connector housing having a first side and a second side, the connector housing including a cavity extending between the front and the rear, the connector housing including a card slot at the front configured to receive a module circuit board of the pluggable module;

a contact assembly received in the cavity, the contact assembly having a contact positioner holding contacts in a contact array, the contacts being arranged in pairs in the contact array, each contact including a mating end, a terminating end, and an intermediate portion between the mating end and the terminating end, the intermediate portion held by the contact positioner, the mating ends extending into the card slot for mating to corresponding signal pads on the module circuit board, wherein the contacts include upper contacts arranged in an upper row to interface with the signal pads on an upper surface of the module circuit board and lower contacts arranged in a lower row to interface with the signal pads on a lower surface of the module circuit board; and a shield structure coupled to the contact assembly, the shield structure including ground shields located between the pairs of the contacts, the ground shields including ground beams extending into the card slot for mating to corresponding ground pads on the module circuit board, the shield structure including a connecting plate held by the contact positioner electrically connected to each of the ground shields to electrically common each of the ground shields, the connecting plate located between the upper and lower rows to provide shielding between the upper contacts and the lower contacts.

2. The card edge connector of claim 1, wherein the ground shields include ground plates, the ground beams extending from the ground plates, the ground plates being held by the contact positioner.

3. The card edge connector of claim 2, wherein each ground shield includes a pair of the ground beams extending from the corresponding ground plate.

4. The card edge connector of claim 1, wherein the ground beams including upper ground beams to interface with the ground pads on the upper surface of the module circuit board and lower ground beams to interface with the ground pads on the lower surface of the module circuit board.

5. The card edge connector of claim 1, wherein the ground shields are coupled to the connecting plate, the ground shields being oriented perpendicular to the connecting plate.

6. The card edge connector of claim 1, wherein the ground shields include ground plates, the ground beams extending from the ground plates, the ground plates including ground plate slots receiving the connecting plate.

7. The card edge connector of claim 6, wherein the connecting plate includes connecting plate slots, the ground plates being received in the connecting plate slots.

8. The card edge connector of claim 1, wherein the connecting plate includes openings, the contact positioner passing through the openings.

9. The card edge connector of claim 1, wherein the contact positioner includes a plurality of contact holders, each contact holder holding a pair of the contacts, the contact holders being separated by gaps, the ground shields being received in the corresponding gaps to position the ground shields between the pairs of the contacts.

10. The card edge connector of claim 9, wherein the contact holders including upper contact holders holding the upper contacts and lower contact holders holding the lower contacts, the connecting plate located between the upper eentaets holders and the lower contact holders.

11. The card edge connector of claim 1, wherein the terminating ends of the contacts include compliant pins configured to be press-fit to a host circuit board, the ground shields including compliant pins configured to be press-fit to the host circuit board.

12. The card edge connector of claim 1, wherein the ground shields include shield panels extending along the ground beams.

13. The card edge connector of claim 12, wherein the shield panels are positioned between the ground beams and the adjacent contacts.

14. The card edge connector of claim 12, wherein each shield panel includes a support arm and a shield arm extending from the support arm, the support arm being coplanar with the ground beam, the shield arm being offset from the ground beam and the support arm and extending an entire length of the ground beam.

15. A card edge connector for mating with a pluggable module, the card edge connector comprising:

a connector housing including a top and a bottom, the connector housing having a front and a rear, the connector housing having a first side and a second side, the connector housing including a cavity extending between the front and the rear, the connector housing including a card slot at the front configured to receive a module circuit board of the pluggable module;

a contact assembly received in the cavity, the contact assembly having a contact positioner holding contacts in a contact array, the contacts being arranged in pairs in the contact array, each contact including a mating end, a terminating end, and an intermediate portion between the mating end and the terminating end, the intermediate portion held by the contact positioner, the mating ends extending into the card slot for mating to corresponding signal pads on the module circuit board; and a shield structure coupled to the contact assembly, the shield structure including ground shields located between the pairs of the contacts, the ground shields including ground beams extending into the card slot for mating to corresponding ground pads on the module circuit board, the ground shields including shield panels extending along the ground beams, wherein the shield panels are positioned between the ground beams and the adjacent contacts.

16. The card edge connector of claim 15, wherein each shield panel includes a support arm and a shield arm extending from the support arm, the support arm being coplanar with the ground beam, the shield arm being offset from the ground beam and the support arm and extending an entire length of the ground beam.

17. The card edge connector of claim 15, wherein the shield structure includes a connecting plate held by the contact positioner, the ground shields being coupled to the connecting plate, the ground shields being oriented perpendicular to the connecting plate, the connecting plate electrically connecting each of the ground shields.

18. The card edge connector of claim 15, wherein the contact positioner includes a plurality of contact holders, each contact holder holding a pair of the contacts, the contact holders being separated by gaps, the ground shields being received in the corresponding gaps to position the ground shields between the pairs of the contacts.

19. A communication system comprising:

a pluggable module including a module circuit board having contact pads at a card edge; and a card edge connector receiving the pluggable module, the card edge connector including a connector housing holding a contact assembly and a shield structure, the connector housing including a top and a bottom, the connector housing having a front and a rear, the connector housing having a first side and a second side, the connector housing including a cavity extending between the front and the rear, the connector housing including a card slot at the front receiving the card edge of the module circuit board, the contact assembly having a contact positioner holding contacts in a contact array, the contacts being arranged in pairs in the contact array, each contact including a mating end, a terminating end, and an intermediate portion between the mating end and the terminating end, the intermediate portion held by the contact positioner, the mating ends extending into the card slot for mating to corresponding signal pads on the module circuit board, wherein the contacts include upper contacts arranged in an upper row to interface with the signal pads on an upper surface of the module circuit board and lower contacts arranged in a lower row to interface with the signal pads on a lower surface of the module circuit board, the shield structure including ground shields located between the pairs of the contacts, the ground shields including ground beams extending into the card slot for mating to corresponding ground pads on the module circuit board, the shield structure including a connecting plate held by the contact positioner electrically connected to each of the ground shields to electrically common each of the ground shields, the connecting plate located between the upper and lower rows to provide shielding between the upper contacts and the lower contacts.

* * * * *